United States Patent Office 3,093,484
Patented June 11, 1963

3,093,484
BROWN SUGAR FLAVOR CONCENTRATE AND METHOD OF MAKING THE SAME
Robert F. Kozlik, Minneapolis, Minn., assignor to General Mills, Inc., a corporation of Delaware
No Drawing. Filed Mar. 12, 1959, Ser. No. 798,804
8 Claims. (Cl. 99—141)

This invention relates to an improved brown sugar flavor concentrate and to the process of making that concentrate. More particularly the present invention relates to an improved brown sugar flavor concentrate which is in the form of a dry, nonlumping product which may be used as an ingredient of dry baker mixes.

In the past, various attempts have been made to incorporate the flavor of brown sugar into dry bakery mixes. Commercially available brown sugar cannot be used in dry mixes in sufficient quantity to impart adequate flavor because of its pronounced tendency to form hard lumps which are difficult to disperse and of course undesirable in a dry bakery mix. One approach to the problem of obtaining the dry, brown sugar flavor material which could be incorporated as an ingredient of dry bakery mixes has been to take commercially available brown sugar, to dry it at high temperatures so as to drive off all moisture and thereby reduce its tendency to form lumps. The principal disadvantages of this method have been the expense involved, the difficulty of handling the commercially available brown sugar prior to its drying, and the fact that the final product still tends to lump, although admittedly to a lesser degree. Still another attempt at obtaining a brown sugar flavoring material to be used in dry bakery mixes has been to create artificial flavoring materials. Unfortunately, however, none of the artificial flavoring materials currently available give a true brown sugar flavor.

One of the objects of the present invention is to produce a brown sugar flavor concentrate possessing an intensified flavor of the true brown sugar character.

A still further object of the present invention is to disclose a process by which a brown sugar flavor concentrate may be prepared which is nonlumping and may therefore be used as an ingredient in dry bakery mixes.

I have made the unexpected discovery that a nonlumping, brown sugar flavor concentrate may be prepared by cooking a solution containing commercial brown sugar to a temperature of 250° to 350° F., and then cooling the solution to form a hard candy, blending it with white sugar, and then grinding the mixture to produce a dry nonlumping product. I find that the product of the above process possesses a flavor which is far superior to that of commercial brown sugar. The cooking of the brown sugar solution so accentuates the brown sugar flavor that in a cream frosting 10 to 15% of this brown sugar concentrate is equal to 40 to 50% of the commercially available brown sugar.

In the practice of the present invention, the commercially available brown sugar is made into an aqueous syrup or solution which contains up to 80% brown sugar. The solution is then cooked in an open container to 280° F. It is removed from the container and allowed to cool to form a hard candy. The resulting hard candy is blended with 3 to 8 parts of white sugar and then ground to a fineness desired for the particular dry mix in which brown sugar concentrate is to be used.

I find it preferable to use five parts of a white sugar such as sucrose, dextrose or the like to one part of the hard candy for most mixes. While confectioners' sugar may be used, and is preferred from an economic standpoint, in the preparation of a dry frosting or icing mix, improved results are obtained by the use of finely ground fondant sugar.

While any of the commercially available brown sugars may be used in the present invention, I find it preferable to use the darker brown sugars, such as No. 13 brown sugar.

No. 13 brown sugar normally has approximately the following composition:

|  | Percent |
|---|---|
| Sucrose | 85–87 |
| Invert sugar | 4.3–5.3 |
| Mineral ash | 1.9–2.9 |
| Undetermined organics | 2.6–3.0 |
| Moisture | ±3.8 |

The present invention will be further illustrated by reference to the following specific examples.

Example I 20 lbs. of No. 13 brown sugar was mixed with 10 lbs. of water to form an aqueous solution. The solution was then cooked over a gas flame in an open kettle to 280° F. The mixture was then removed to a greased cooling slab and allowed to spread naturally. Upon cooling the hard candy formed was then broken into 2 to 3 inch pieces and blended with 5 parts of white sugar. The blend was then ground in a Fitzmill till it passed through a 1/16 inch mesh screen. A dry, uniformly colored, nonlumping product was obtained which possessed an intensified brown sugar flavor.

Example II 20 lbs. of No. 13 brown sugar was mixed with 10 lbs. of water to form a solution. The solution was then cooked over a gas flame in an open kettle to a temperature of 280 to 300° F. The mixture was then removed to a greased cooling slab and allowed to spread naturally. The cooled hard candy was then broken in 2 to 3 inch pieces and blended with 5 parts of fondant sugar which had been finely ground. The blend was then ground at high speed in a Fitzmill which was equipped with a 2A screen. The resulting dry, finely divided, nonlumping product was found to possess an intensified brown sugar flavor.

Since changes and modifications in carrying out the above-described process and certain modifications in the composition which embody the invention may be made without departing from the invention's scope, it is intended that all matter contained in the above description shall be interpreted as illustrative and not in a limiting sense.

I claim:

1. A method for intensifiying brown sugar flavor which comprises heating a solution consisting essentially of brown sugar and water until said solution is capable of forming a hard candy, immediately cooling said candy before appreciable degradation of the sugar takes place, and obtaining thereby a hard candy having an intensified brown sugar flavor.

2. A method for preparing a dry, finely divided brown sugar flavor concentrate which comprises heating a solution consisting essentially of brown sugar and water until said solution is capable of forming a hard candy, immediately cooling said candy before appreciable degradation of the sugar takes place, mixing the cooled hard candy with sugar, and reducing the mixture of hard candy and sugar to a finely divided form.

3. A method of claim 2 wherein the cooled, hard candy is blended with 3–8 parts of sugar.

4. The method of claim 2 wherein the sugar is sucrose.

5. The method of claim 2 wherein the sugar is fondant sugar.

6. The method of claim 2 wherein the sugar is dextrose.

7. The composition which comprises a brown sugar flavor concentrate prepared by heating the solution consisting essentially of brown sugar and water until said solution is capable of forming a hard candy, immediately cooling said candy before appreciable degradation of the sugar takes place, and obtaining thereby a hard candy having an intensified brown sugar flavor.

8. The composition which comprises a finely divided mixture of white sugar and a brown sugar flavor concentrate prepared by heating a solution consisting essentially of brown sugar and water until said solution is capable of forming a hard candy immediately cooling said candy before appreciable degradation of the sugar takes place, and obtaining thereby a hard candy having an intensified brown sugar flavor.

References Cited in the file of this patent

UNITED STATES PATENTS

| | | |
|---|---|---|
| 2,019,365 | Speed | Oct. 29, 1935 |
| 2,373,919 | Schwieger | Apr. 17, 1945 |
| 2,910,386 | Lachmann | Oct. 27, 1959 |

OTHER REFERENCES

"Everybody's Cookbook," by Lord, revised edition, Harcourt, Brace and Company, New York, 1937, p. 730.

"Everybody's Cookbook," by Lord, revised edition, Harcourt, Brace and Company, New York, 1937, pp. 728 and 729.